United States Patent [19]

Wong

[11] 4,387,511
[45] Jun. 14, 1983

[54] CAM MASTER SPIDER IDENTIFIER

[75] Inventor: Jon H. Wong, Sterling Heights, Mich.

[73] Assignee: Rockwell International Corporation, Pittsburgh, Pa.

[21] Appl. No.: 277,517

[22] Filed: Jun. 26, 1981

[51] Int. Cl.³ .............................................. G01B 3/00
[52] U.S. Cl. ................................. 33/1 BB; 33/174 G; 33/181 AT
[58] Field of Search ......... 88/1 A; 33/1 BB, 181 AT, 33/180 AT, 174 R, 174 G

[56] References Cited

U.S. PATENT DOCUMENTS

| | | | |
|---|---|---|---|
| 2,003,556 | 6/1935 | Saballus | 33/180 AT |
| 2,059,407 | 11/1936 | Spase | 33/181 AT |
| 2,117,854 | 5/1938 | Price | 33/181 AT X |
| 3,241,244 | 3/1966 | Jones | 33/180 AT |
| 3,685,160 | 8/1972 | MacKeigan | 33/181 AT |
| 4,208,798 | 6/1980 | Sampson | 33/180 AT |

Primary Examiner—William D. Martin, Jr.

[57] ABSTRACT

An apparatus and method for identifying automotive brake spiders is disclosed. These spiders are of the type having two anchor pin holes which extend between a first and second side of a boss on the spider. An axle spindle hole, capable of receiving the automotive axle therethrough is centrally provided in the spider. A single actuator rod hole is provided and extends from a first to a second side of the spider and is located at the end of the spider opposite the end containing the anchor pin holes. The anchor boss is offset from the first and second sides of the spider. The spider has an axis running through the centers of the actuating rod hole and the spindle hole which perpendicularly bisects a line between the centers of the anchor pin hoels. The apparatus itself has cylindrical posts which engage the actuator hole and the anchor pin holes to support and position the brake spider. A combination depth gauge and angular pointer is mounted on the apparatus to fit within the spindle hole and is capable of measuring the offset between the second side of the anchor pin boss and the first side of the brake spider and is also capable of measuring the angular offset various holes on the spider from the above defined axis measured from a center located at the center of the spindle hole.

11 Claims, 5 Drawing Figures

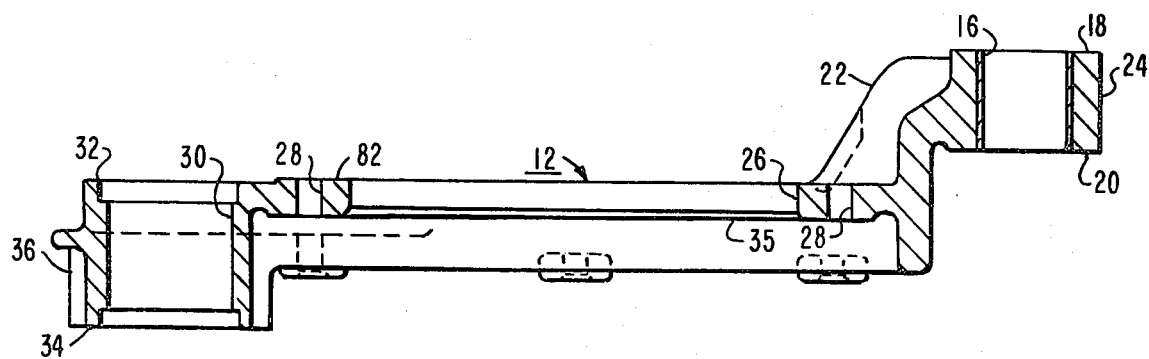
FIG. 3
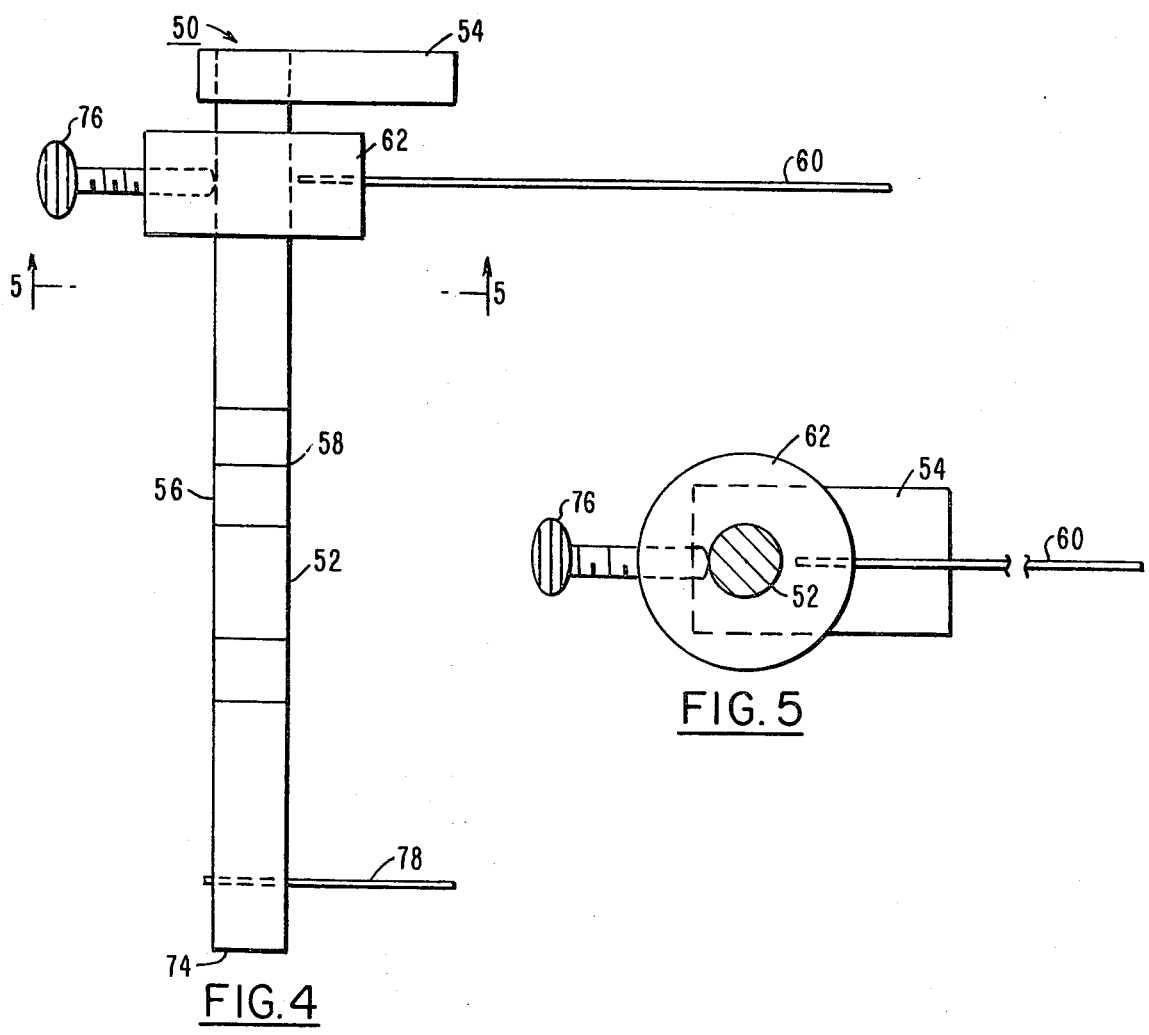
FIG. 4
FIG. 5

CAM MASTER SPIDER IDENTIFIER

BACKGROUND OF THE INVENTION

1. Field of the Invention

This invention relates to an apparatus and method for identifying and distinguishing among automotive brake spiders. More specifically an apparatus is provided which measures certain critical dimensional characteristics which vary slightly from one brake spider to another to enable quick identification for replacement part selection purposes.

2. Description of the Prior Art

In automotive vehicles of conventional design, such as trucks, tractors, busses or trailers, it is a common practice to mount all the wheel brake mechanism, except the brake drum which rotates with the wheel, on a relatively stationary support plate known in the art as a brake spider. This brake spider is usually non-rotatably secured to the axle or axle housing either by being bolted to an intergral axle flange or welded directly thereto. Conventional brake mechanisms in vehicles of the class referred hereto consist in general of two internally expanding brake shoes pivoted or anchored by pins on one end of the brake spider, and the other ends of the brake shoes adapted to be spread apart for drum engagement by means of a rotatable brake actuating cam having a shaft or rod journaled in the end of the brake spider opposite the pivot points. The anchor end of the brake spider is usually provided with two spaced apart through bores or holes to receive hardened anchor pins of the brake shoes and the opposite end of the brake spider is provided with another through bore to receive a bushing or bearing to support the cam shaft.

U.S. patents showing typical brake spiders are U.S. Pat. No. 2,167,607 issued to H. W. Alden on July 5, 1939, U.S. Pat. No. 3,131,583 issued to W. G. Henley at al. on May 5, 1964 and U.S. Pat. No. 4,157,747 issued to Getz at al. dated June 12, 1979.

It has been found that there has been difficulty in assemblying and repairing brakes on the heavy duty vehicles listed above because of the difficulty in distinguishing between a variety of brake spiders which may differ only slightly but are not interchangeable. It has been left to the present invention to provide a means for quickly and accurately distinguishing between various brake spiders commonly used in truck braking systems. As far as is known to the inventor, no similar apparatus or method for identifying brake spiders exists.

SUMMARY OF THE INVENTION

It is an object of this invention to provide an apparatus for identifying automotive brake spiders.

It is a further object of this invention to provide a method of utilizing an apparatus to differentiate between a multiplicity of automotive brake spiders.

It is an additional object of this invention to identify automotive brake spiders of the type having two anchor pin holes and the one cam actuator rod hole and capable of being mounted on an automotive truck axle.

It is yet an additional object of this invention to provide a quick and economical means for identifying brake spiders for use both in the original manufacturers plant and for use by parts suppliers in the automotive aftermarket.

These and other objects of the invention are disclosed in the preferred method and apparatus for identifying automotive brake spiders of the type having two anchor pin holes which extend between a first and second side an anchor pin boss. The anchor pin hole boss is located at the first end of the spider and are capable of receiving brake shoe anchor pins therethrough. The spider has a centrally located spindle hole capable of receiving a spindle of an automotive axle therethrough and a single actuator rod hole extending from a first to a second side of the spider. A plurality of mounting holes are located in a circular pattern around the spindle hole. The cam actuator rod hole is located at the end of the spider opposite the first end where the anchor pin boss is located. The actuator rod hole is capable of receiving a brake actuating rod therethrough. The anchor pin boss is offset from the first and second sides of the spider. The spider has a longitudinal axis running through centers of the actuating rod hole and the spindle hole perpendicularly bisecting a line between the centers of the anchor pin holes. To identify the brake spider, one places it on a support fixture which includes means engageable with the actuator holes and at least one of the anchor pin holes to support and position the spider. One then measures the offset between the second side of the anchor pin boss and the first side of the brake spider. The angular offset between the centers of the spindle hole and a mounting hole is measured from an axis running through the centers of the spindle hole and the actuating rod hole. Then the diameters of the spindle hole and the mounting hole circle are measured along with the size and number of mounting holes. The results of these measurements are compared with a predetermined dimensions thereby enabling one to select correct placement for each spider.

These and other objects and advantages of the invention will become apparent from the following description of the accompanying drawings.

BRIEF DESCRIPTION OF THE DRAWINGS

FIG. 3 is a sectional side elevation view of the spider shown in FIG. 2 generally along lines 3—3;

FIG. 4 is an elevation view of the angle/depth gauge shown in FIGS. 1-3;

FIG. 5 is a plan view of the movable portion of the angle/depth gauge shown in FIG. 4 along lines 4—4.

DESCRIPTION OF THE PREFERRED EMBODIMENT

Figure 1:
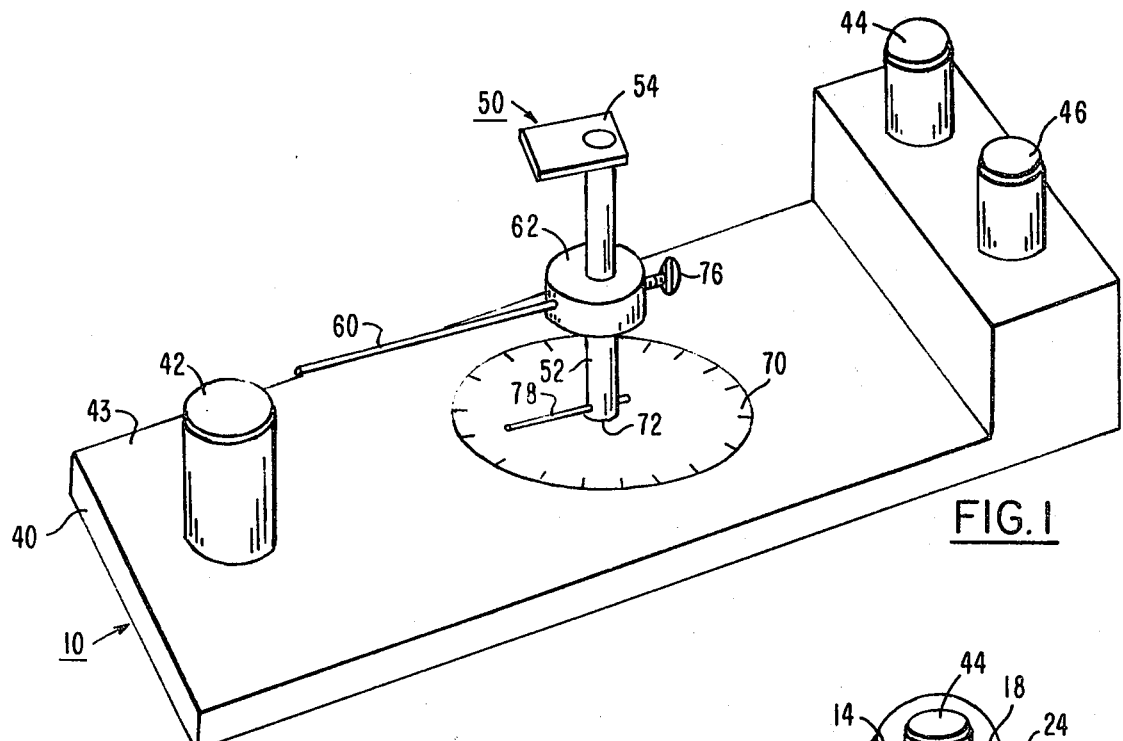
FIG. 1 is an isometric view of the gauge of the present invention.

The preferred embodiment for a gauge capable of identifying automotive brake spiders is shown in FIG. 1 and is generally denoted as 10. The gauge 10 is capable of identifying automotive brake spiders of the type shown in FIGS. 2 and 3 and generally denoted as 12.

Figure 2:
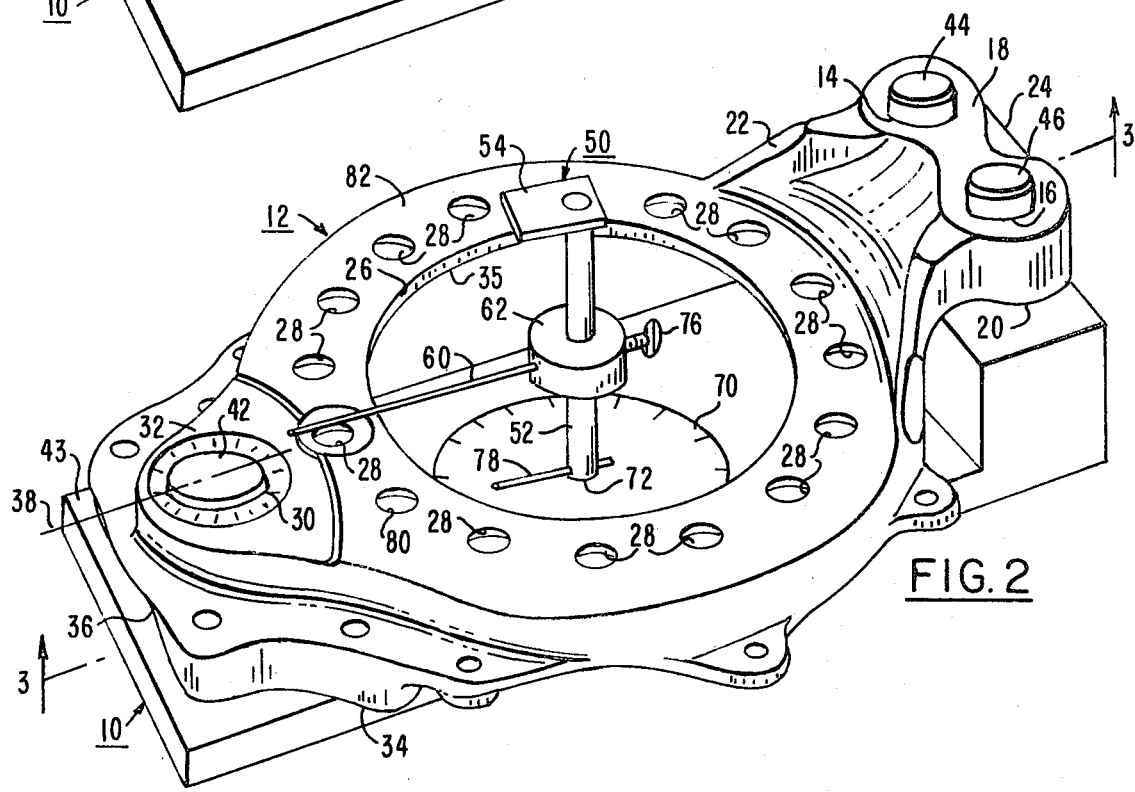
FIG. 2 is a isometric view of the gauge shown in FIG. 1 with a brake spider mounted thereon.

The spider 12 shown in FIGS. 2 and 3 has two anchor pin holes 14 and 16 which extend between a first side 18 and a second side 20 of a boss generally denoted as 22 on the spider 12. The anchor pin holes 14, 16 are located at a first end 24 of the spider and are capable of receiving brake shoe anchor pins (not shown) therein. A spindle hole 26 capable of receiving an automotive axle (not shown) therethrough is centrally located within the brake spider. A plurality of mounting holes 28 are distributed in a circular pattern around the spindle hole 26. The single actuating rod hole 30 extends from a first side 32 of the spider 12 to a second side 34. The actuating rod hole 30 is located at an end 36 of the spider 12 opposite from the end 24. The actuator rod hole is capable of receiving a brake actuating rod (not shown) therethrough. The brake spider 12 has an axis 38 which runs through the centers of the actuating rod hole and the spindle hole and perpendicularly bisects a line connecting the centers of the anchor pin holes.

As can be seen in FIG. 1, the preferred gauge 10 comprises a support plate 40 with three posts 42, 44 and 46 mounted thereon. The posts 42, 44 and 46 extend away from surface 43 of support plate 40. The posts 42 is capable of engaging the actuating rod hole 30 while the posts 44 and 46 are capable of engaging the anchor pin holes 14 and 16. The post 42, 44 and 46 are designed to fit snuggly within the diameters of the holes 30, 14 and 16 respectively. The diameters of the holes 30, 14 and 16 do not vary within specific groups of brake spiders. Specifically, brake spiders for a widely manufactured class of automotive truck brakes have identical anchor pins and actuating rod diameters. It can be seen that if it is desired to distinguish between brake spiders having different diameter actuating rod and anchor pin holes the posts 42, 44 and 46 could be made removable from the support plate 40 so that posts of varying diameters can be inserted to provide support for the various brake spiders 12. The different diameter posts would be utilized as part of the identification process if brake spiders having varying anchor and actuator rod holes were utilized. Also it should be noted that one post 44 or 46 would be sufficient to support the end 24 of the brake spider although this is not the preferred method.

When the spider 12 is placed on parts 42, 44 and 46 of the gauge 10, surface 34 contacts the top surface 43 of support plate 40. The posts 44 and 46 support the end 24 of spider 12 by reason of the only fit between the posts 44 and 46 and the holes 14 and 16 respectively.

The gauge 10 is also provided with a gauge means 50 which is capable of measuring the brake centerline offset between the side 35 of spider 12 and the center of boss 22 (distance between side 20 and side 18). In the preferred embodiment, this means consists of a graduated stand 52 having a base 54 and a graduated post 56. The post 56 is graduated by having line markings 58 described thereon at predetermined intervals which correspond with the brake centerline offsets of various brake spiders in use.

In the preferred embodiment, the mounting plate 40 has a 360° scale marked thereon. The markings can be either stamped or cast into the middle of the plate or stenciled thereon. The zero-180° markings are oriented along the axis 38 of the brake spider. In the preferred embodiment the mounting plate 40 the hole 72, which is capable of receiving the post 56 of the depth gauge 50, is mounted at the center of the 360° scale. The end 74 of post 56 can be inserted into the hole 72 which is of sufficient depth to provide support for the gauge means 50. In the preferred embodiment the hole 72 is of such a diameter to permit the rotation of post 56 therein while maintaining the perpendicularity of the post 56 with respect to support plate 40. The circular slide ring 62 with its pointer 60 is capable of being locked in position on the post both vertically and angularly by a thumb screw 76.

To utilize the depth gauge means 50, the brake spider is placed on the gauge as shown in FIG. 2 with surfaces 35 and 20 facing toward support plate 40. In the preferred embodiment, surfaces 20 and 35 are machined surfaces. The support member 54 of depth gauge 50 is then placed on the surface 35 and the movable pointer 60 on a slide ring 62 is moved into contact with surface 18 of anchor pin boss 22. The offset can be then read on the appropriate line 58 on post 56 by gauge 50. It should be noted that the distance measured is the distance between surface 35 and surface 18. The lines 58, however, are marked with the offset between the brake centerline (not shown) and surface 35. The distance is the information carried in the standard parts catalog.

The preferred method of identifying brake spiders of the type described above requires that the offset between the anchor pin boss surfaces 18 and 20 and the brake spider surface 35 be determined as described above. In addition, the angular offset of a predetermined mounting hole from the axis 38 measured from the center of the spindle hole 26 must be determined. To measure the angular offset it is necessary that the hole 72 in mounting plate 40 coincide with the center of hole 26. The class of brake spiders to be measured by the preferred gauge 10 has the same location of the anchor pin holes 14 and 16 and the actuating rod hole 30 thereby always locating the center of the spindle hole 26 at the same point in relation to the mounting plate 40 even if the diameter of hole 26 varies. This point is the location of the hole 72 on mounting plate 40. If it would be desired to measure brake spiders having variable locations for the holes 14, 16 and 30 along the axis 38, the posts 42, 44, 46 could be made movable along the axis 38 such as by being mounted on slots on mounting plate 40 thereby allowing for the accomodation of longer brake spiders on the gauge 10. Also the mounting plate 40 could be made in two pieces so that the plate 40 could be lengthened by sliding the ends thereof apart. Similarly, if the center-to-center distance of holes 14 and 16 varied, the post 44, 46 could be mounted so as to be movable in a direction perpendicular to axis 38.

In the preferred method, the angular offset between the axis 38 and a predetermined hole 80 of the mounting holes 28 is measured by inserting post 56 of depth gauge 52 into hole 72 on mounting plate 40, then rotating slide block 62 and moving the pointer 60 into alignment with the center of the predetermined hole 80 and reading the angular offset on the scale 70 on mounting plate 40 with pointer 78.

In the preferred method, other measurements are made on the brake spider 12, specifically, measuring the diameter of the spindle hole 26 with an appropriate measuring device (not shown), measuring the diameter of the mounting hole circle 82 with this measuring device, measuring the size of the mounting holes and counting the number of mounting holes. The measuring of the various bolt circles and mounting hole diameters can be accomplished by using a finely divided scale or ruler laid along axis 38.

Once the above information is obtained, it can be compared with predetermined information contained in a parts catalog and then one can easily determine the correct replacement brake spider to be utilized in a given application. It can be seen that it would be possible that in some groups of brake spiders, identification can be made using fewer measurements than that required for the preferred spider. On the other hand, in some cases even more measurements might be required for identification purposes. In identifying the preferred brake spider 12, a comparison as described above is required.

As can be seen, the preferred embodiment of gauge 10 ha a single means 50 for measuring the offset of boss 22 and the angular displacement of hole 82 from axis 38. It would be simple for one of ordinary skill to utilize two separate means for measuring these two variables.

While the preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the appended claims.

The embodiments of the invention in which an exclusive property or privilege is claimed are defined as follows:

1. An apparatus for identifying automotive brake spiders of the type having two anchor pin holes which extend between a first and second side of a boss on said spider said anchor pin holes at a first end of said spider and capable of said spider capable of receiving an automotive axle spindle therethrough, a plurality of mounting holes in a circular pattern around said spindle hole extending from a first to a second side of said spider, said first side of said spider capable of engaging a mounting flange on said spindle, a single actuator rod hole located at the end of said spider opposite said first end, said boss offset from said first side of said spider, said spider having an axis running through the centers of said actuating rod hole and said spindle hole and perpendicularly bisecting a line in between the centers of said anchor pin holes, said apparatus comprising: means for supporting and positioning said brake spider; depth gauge means, removably mounted on said supporting and positioning means, capable of measuring the offset between said anchor pin boss and said first side of said brake spider and means capable of measuring the angular offset of a predetermined mounting hole from said axis, said angular offset measured from a center located at said center of said spindle hole, said means for measuring said angular offset being rotatably mounted on said supporting and positioning means.

2. An apparatus as set forth in claim 1 wherein said means for positioning and supporting said brake spider is comprised of cylindrical posts capable of extending through said actuating pin hole and at least one of said anchor pin holes of said brake spider.

3. An apparatus as set forth in claim 2 wherein said cylindrical posts are mounted on a support plate having the approximate length and width of said brake spiders.

4. An apparatus as set forth in claim 3 wherein said depth gauge means and said means to measure said angular offset are combined into a single means comprised of a post capable of being removably mounted on said support plate, said post having graduated markings to measure height thereon, and said post being capable of rotation while mounted on said support plate to measure said angular offset.

5. An apparatus as set forth in claim 4 wherein said post is capable of being rotatably and removably mounted on said support plate within said spindle hole.

6. An apparatus as set forth in claim 5 wherein said angular offset is measured by reading angular markings on said support plate in conjunction with a pointer fixedly mounted on said removable end rotatable post.

7. An apparatus for identifying among automotive brake spiders of the type having two anchor pin holes which extend between a first and second side of a bar on said spider, said anchor pin holes located at a first end of said spider and capable of receiving brake shoe anchor pins therein, a spindle hole in said spider capable of receiving an automotive axle spindle therethrough, a plurality of mounting holes in a circular pattern around said spindle hole extending from a first to a second side of said spider, said first side of said spider capable of engaging a mounting flange in said spindle and a single actuating rod hole located at the end of said spider opposite said first end, said boss being offset from said first and second sides of said brake spider, said apparatus comprising: support means for supporting and positioning said spider; and gauge means capable of determining the offset between the centerline of said anchor pin boss and said first die of said brake spider, said gauge means also capable of measuring the angular offset between the centers of said spindle hole and a predetermined mounting hole measured from an axis through the centers of said spindle hole and said actuating rod hole said gauge means being rotatably and removably mounted on said support means within said spindle hole.

8. The apparatus as set forth in claim 7 wherein said support means comprises post capable of extending through said actuating hole and said anchor pin holes of said brake spider, said post capable of contacting the inner diameters of said holes thereby supporting and positioning said spider.

9. A method of identifying among automotive brake spiders of the type having two anchor pin holes extending between a first and second side of a boss on said spider, said anchor pin holes located at a first end of said spider and capable of receiving brake shoe anchor pin therein, a spindle hole capable of receiving an automotive axle spindle therethrough, a plurality of mounting holes in a circular pattern around said spindle holes extending from a first to a second side of said spider, said first side of said spider capable of engaging a mounting flange on said spindle, a plurality of mounting holes in a circular pattern around said spindle hole, single actuator rod hole located at the end of said spider opposite said first end, said anchor pin boss offset from said first and second sides of said spider, said method comprising: placing said brake spider on a support fixture capable of supporting and positioning said brake spider, applying a depth gauge indicating means which includes a first post removably mounted on said support fixture, a support member at one end of said first post, and a first movable, slidable pointer mounted on said first post such that said support member contacts said first side of said spider and said first pointer contacts said second side of said boss thereby indicating said offset between said second side of said anchor pin boss and said first side of said brake spider, applying an angular offset measuring means which includes a second post being rotatably mounted on said support fixture, a second movable, slidable pointer on said second post, and a fixed pointer located at one end of said second post, to determine the angular offset between the centers of said spindle hole and a predetermined mounting hole from said axis running through the centers of said spindle hole and actuating rod hole by aligning said second pointer with said axis, rotating said second pointer into alignment with the center of said predetermined hole, and determining the angular offset on a scale mounted by said fixed pointer, inserting a hole diameter measuring means into said spindle hole to determine the diameter of said spindle hole, inserting said hole diameter measuring means into said mounting hole circle to determine the diameter of said mounting hole circle, inserting said hole diameter measuring means into said mounting holes to determine the diameter of said mounting holes, counting the number of mounting holes, and matching the results of the above determinations with a predetermined spare part identification list thereby enabling one to select the correct replacement brake spider.

10. A method as set forth in claim 9 wherein the step of placing said spider on said support fixture is accomplished by placing said actuator rod hole and said anchor pin holes on complementary cylindrical posts mounted on base plate of said support fixture.

11. A method as set forth in claim 10 wherein said brake spider is placed on said posts with said anchor pin boss oriented away from said base plate of said support fixture.

* * * * *